(12) United States Patent
Müller et al.

(10) Patent No.: US 8,276,885 B2
(45) Date of Patent: *Oct. 2, 2012

(54) SUPPORT JACK

(75) Inventors: Gerald Müller, Obertshausen (DE); Günter Seidel, Riedstadt (DE); Jośe Algüera, Aschaffenburg (DE)

(73) Assignee: Jost-Werke GmbH, Neu-Isenburg (DE)

( * ) Notice: Subject to any disclaimer, the term of this patent is extended or adjusted under 35 U.S.C. 154(b) by 411 days.

This patent is subject to a terminal disclaimer.

(21) Appl. No.: 11/996,537

(22) PCT Filed: Jul. 20, 2006

(86) PCT No.: PCT/EP2006/007145
§ 371 (c)(1),
(2), (4) Date: Jan. 23, 2008

(87) PCT Pub. No.: WO2007/012426
PCT Pub. Date: Feb. 1, 2007

(65) Prior Publication Data
US 2008/0224113 A1    Sep. 18, 2008

(30) Foreign Application Priority Data
Jul. 23, 2005    (DE) .......................... 10 2005 034 555

(51) Int. Cl.
*B60S 9/02* (2006.01)
*B60S 9/14* (2006.01)
*B60D 1/66* (2006.01)
*B60S 9/04* (2006.01)

(52) U.S. Cl. ........ 254/419; 254/420; 254/421; 254/425; 280/475

(58) Field of Classification Search .................. 254/419, 254/420–425; 280/475
See application file for complete search history.

(56) References Cited

U.S. PATENT DOCUMENTS

| | | | | |
|---|---|---|---|---|
| 2,815,962 A * | 12/1957 | McKay | ......................... | 254/419 |
| 3,489,395 A * | 1/1970 | Glassmeyer | ................. | 254/419 |
| 3,880,403 A * | 4/1975 | Glassmeyer | ................. | 254/419 |
| 5,238,266 A * | 8/1993 | VanDenberg | ............. | 280/766.1 |
| 5,676,018 A * | 10/1997 | VanDenberg | ................. | 74/373 |
| 6,062,545 A * | 5/2000 | Peavler | ......................... | 254/418 |
| 6,764,065 B2 * | 7/2004 | Fox | ............................... | 254/420 |
| 6,846,016 B2 * | 1/2005 | VanDenberg et al. | ..... | 280/763.1 |
| 7,083,196 B2 * | 8/2006 | Riedl | ......................... | 280/763.1 |
| 7,163,207 B2 * | 1/2007 | Baird et al. | ................ | 280/6.153 |
| 7,380,825 B2 * | 6/2008 | Peveler | ....................... | 280/766.1 |
| 7,398,959 B2 * | 7/2008 | VanDenberg et al. | ........ | 254/419 |
| 2008/0197332 A1 * | 8/2008 | Siedel et al. | .................. | 254/424 |
| 2008/0224113 A1 * | 9/2008 | Muller et al. | ................ | 254/419 |

* cited by examiner

*Primary Examiner* — Lee D Wilson
*Assistant Examiner* — Alvin Grant
(74) *Attorney, Agent, or Firm* — Brinks Hofer Gilson & Lione (57) ABSTRACT

A support jack, in particular for supporting semitrailers, includes a vertically telescopically displaceable supporting element having an outer sleeve, and an inner sleeve that can be vertically displaced in a telescopic fashion, each sleeve having a rectangular cross-section with four sidewalls. At least the inner sleeve has a wall plate joined to two adjacent side walls with welding seams that improve the bending stiffness of the support jack. The welding seams can be located inside or outside either of the sleeves. Such a support jack can be located on the lower side of any vehicle.

16 Claims, 8 Drawing Sheets

SUPPORT JACK

BACKGROUND

The invention relates to a support jack, in particular, for supporting semitrailers, said support jack comprising a vertically telescopically displaceable supporting element having an outer sleeve and an inner sleeve, each sleeve having a rectangular cross-section with four sidewalls. The invention also relates to an arrangement of a support jack on a vehicle.

Such support jacks are used especially for supporting the semitrailers of a semitrailer truck. These support jacks are manufactured from square pipes, which are inserted into each other in the manner disclosed by way of example in EP 1 104 369 B1 or EP 0 513 973 B1.

The use of support jacks involves the necessity of ensuring a bending stiffness that is required depending on the load. This is achieved by providing the square pipes with appropriate wall thickness or appropriately large cross-sectional dimensions.

Another measure known from the prior art and taken for improving the bending stiffness is to provide a third sleeve, namely a stiffening sleeve, in the inner sleeve. This considerably reduces the interior of the support jack and increases the overall weight.

It is the object of the invention to provide a support jack, which dispenses with additional stiffening sleeves and has at least the same bending stiffness as conventional support jacks. It is also an object of the present invention to specify a bend-resistant arrangement of a support jack on a vehicle.

SUMMARY

To achieve this object, at least one sidewall of at least the inner sleeve comprises an additional wall plate or consists of a wall plate to which the two adjacent sidewalls are fixed.

It has been found that the bending stiffness of the entire support jack can be improved distinctly if at least the inner sleeve comprises at least one wall plate, which is either fixed to the conventional square pipe, preferably to the outer side thereof, or which itself forms a sidewall of the inner sleeve.

In the second case, the adjacent sidewalls are connected to this wall plate, thereby creating a more stable design than possible if the wall plate is an integral component of a square pipe, as in conventional inner sleeves. It is thus possible inter alia to produce a rectangular connection between this wall plate and the adjacent sidewalls. This also involves advantages in terms of stability as opposed to the round corner areas of a square pipe.

The adjacent sidewalls of the sleeve are preferably welded on to the wall plate. The weld seams can be located in the interior of the sleeve or preferably on the outer side of the sleeve. The latter is of advantage especially from aspects relevant to the manufacturing process.

It has also turned out to be advantageous if the wall plate protrudes in relation to the adjacent sidewalls. This means that the adjacent sidewalls abut against the surface of the wall plate and are fixed or particularly welded to the wall plate. This further improves the bending stiffness of the support jack if a load is applied in a direction extending parallel to the plane of the wall plate.

The bending stiffness of the support jack is further improved if both the inner sleeve and the outer sleeve each comprise at least one such wall plate.

In order to be able to insert an inner sleeve including a wall plate, which protrudes in relation to the adjacent sidewalls, into an outer sleeve, those sidewalls of the outer sleeve that are adjacent to the protruding wall plate of the inner sleeve each comprise a flared wall section. It is also possible to provide the corresponding sidewalls of the inner sleeve with flared wall sections. The flared wall sections improve the bending stiffness of the support jack in the direction extending parallel to the wall plate.

The related sleeve can also be designed from four wall plates. This improves the bending stiffness of the support jack in two spatial directions.

In additional embodiments, the sleeve comprises a U-profile or two angle profiles in combination with a wall plate.

All embodiments can also be combined with flared wall sections, it being possible to provide one to four flared wall sections for each sleeve, depending on the direction in which the bending stiffness is to be further improved.

The sleeve can also comprise a square pipe as in conventional support jacks. In this case, a wall plate is fixed to at least one outer side of the square pipe, namely to that outer side the bending stiffness of which is to be improved.

When the support jack is arranged on the lower side of a vehicle, the support jack is not subjected to equally heavy loads in all directions in relation to its bending stiffness. It is therefore important to ensure when arranging the support jack that at least one wall plate of the invention is oriented parallel to the direction of travel. The load in relation to the bending stiffness is exerted on the support jack namely in or opposite to the direction of travel when the support jack is in the support position.

It is further advantageous if the wall plate points toward the inner side of the vehicle. In this case, the support jack is provided with bending stiffness at the location of the point of load application, namely at the location where the support jack is also fixed to the vehicle.

The sleeves are preferably manufactured from steel or any other high-strength material.

BRIEF DESCRIPTION OF THE DRAWINGS

Exemplary embodiments of the inventions are explained in more detail below with reference to the drawings, in which.

DESCRIPTION OF PREFERRED EMBODIMENTS

Figure 1:
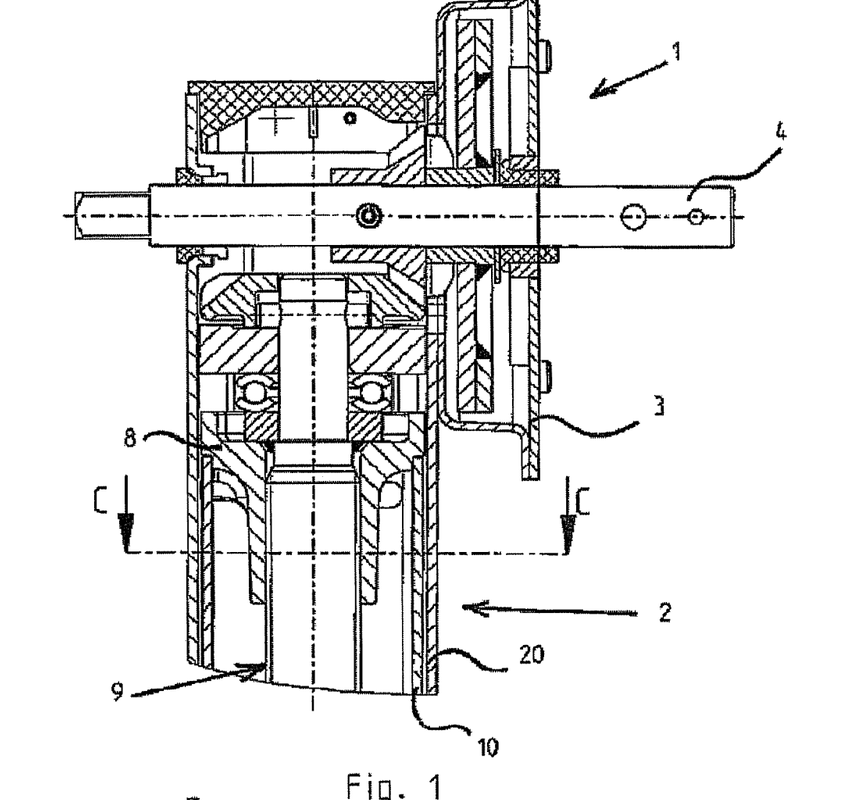
FIG. 1 is a vertical section of a support jack.

FIG. 1 shows a vertical section of the upper part of a support jack 1. The support jack 1 comprises a supporting element 2, which comprises an inner sleeve 10 and an outer sleeve 20, it being possible to telescope the inner sleeve 10 downwards. For this purpose, there are provided a spindle 9 and a spindle nut 8, which is supported on the inner sleeve 10. Furthermore, a transmission, a gearbox 3, and an input shaft 4 are provided. The gear construction is not relevant to the present invention.

Figure 2:
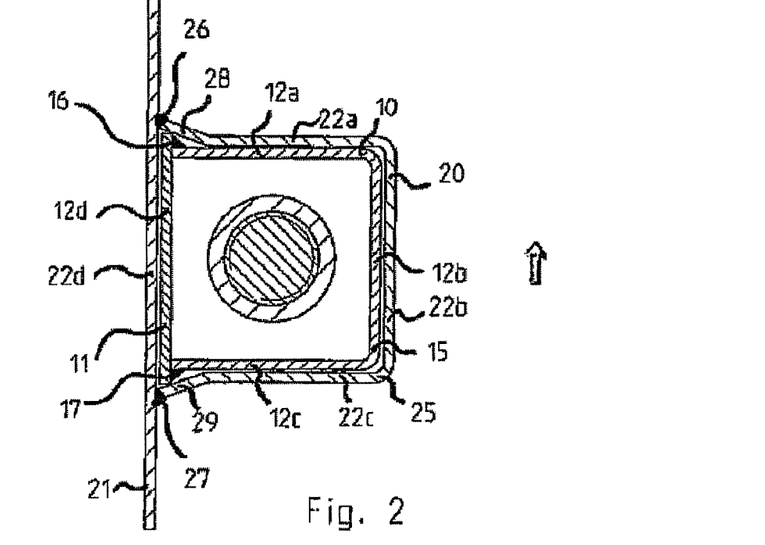
FIG. 2 is a horizontal section taken along line C-C through the support jack shown in FIG. 1, FIGS. 3a, 3b are cross-sections of two sleeves according to two embodiments.

FIG. 2 shows a section taken along line C-C of the support jack shown in FIG. 1. It is apparent that the inner sleeve 10 comprises a U-profile 15, which forms the sidewalls 12a, b, c and is fixed to a wall plate 11, which forms the sidewall 12d. The wall plate 11 protrudes outwardly in relation to the U-profile 15 and thus in relation to the sidewalls 12a and 12c. The weld seams 16 and 17 are disposed outside. The advantage of extending the wall plate 11 in relation to the U-profile 15 is that the welding can be performed from the outside.

The outer sleeve 20 has a cross-sectional contour that is adapted to suit the former and consists of a wall plate 21, which folios the sidewall 22*d*, and likewise a U-profile 25, which forms the sidewalls 22*a-c*. The flared wall sections 28, 29 are fixed by means of externally located weld seams 26, 27 to the surface of the distinctly extended wall plate 21, which in turn can be mounted on a fixing element of a vehicle (not shown). The advantage of this embodiment is that it achieves particularly effective bending stiffness in the direction of travel, which is indicated by the arrow.

Figure 3A:
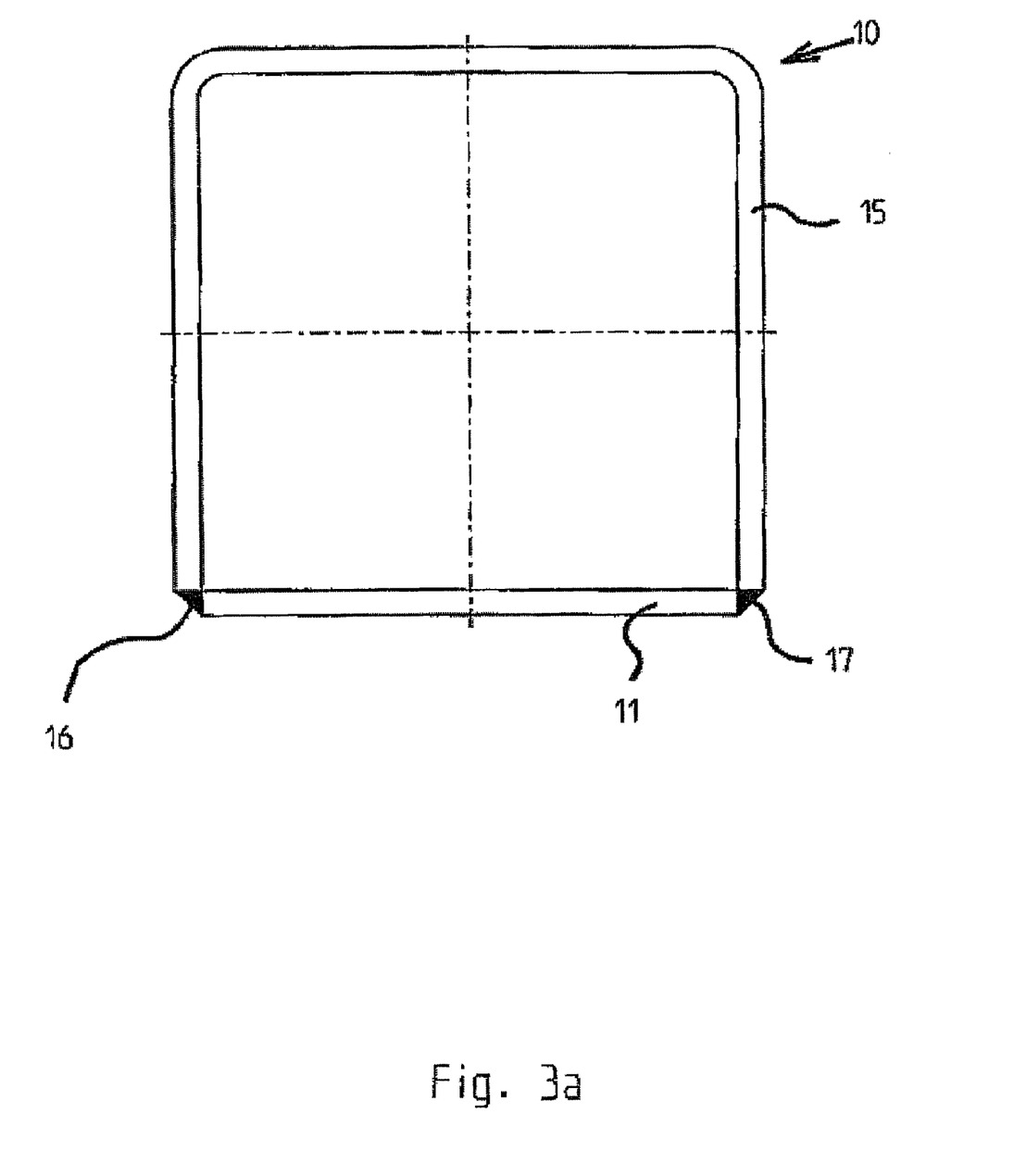

FIG. 3*a* shows the cross-section of another design form of a sleeve 10. The wall plate 11, in a shortened form here, extends only across the inner cross-section of the sleeve 10. There is thus no lateral projection. The weld seams 16, 17 are located on the front surfaces of wall plate 11 and U-profile 15. The advantage of this embodiment is that the wall plate 11 is provided with a shorter design and the bending stiffness is greater than that of a square pipe.

Figure 3B:
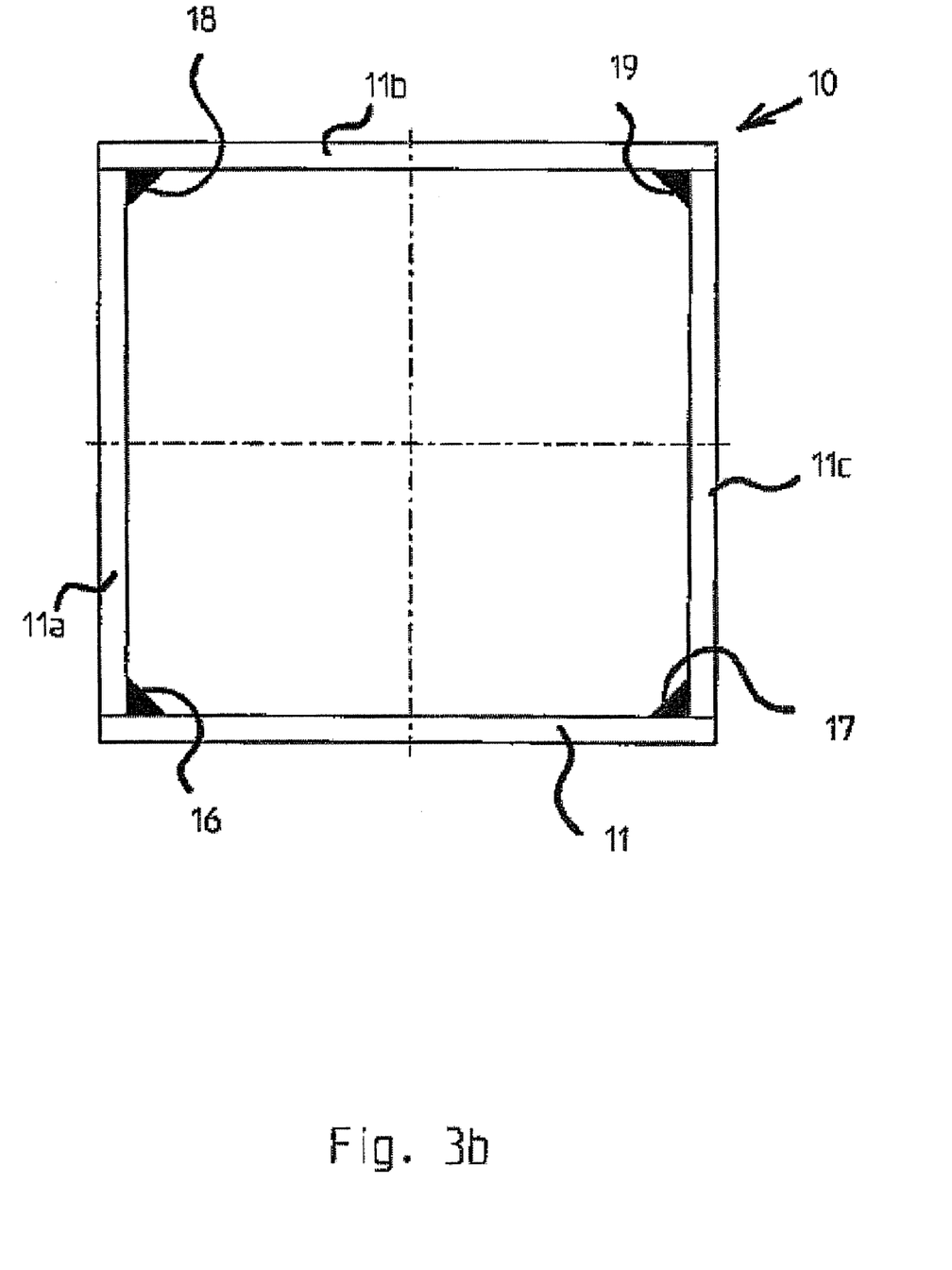

FIG. 3*b* shows an embodiment formed of four individual wall plates 11, 11*a*, 11*b*, and 11*c*. The wall plates 11 and 11*b* abut against the front surfaces of the wall plates 11*a* and 11*c*. The weld seams 16 to 19 are disposed on the inner side of the sleeve 10. The advantage of this embodiment is that the bending stiffness in all directions is greater than that of a square pipe.

Figure 4:
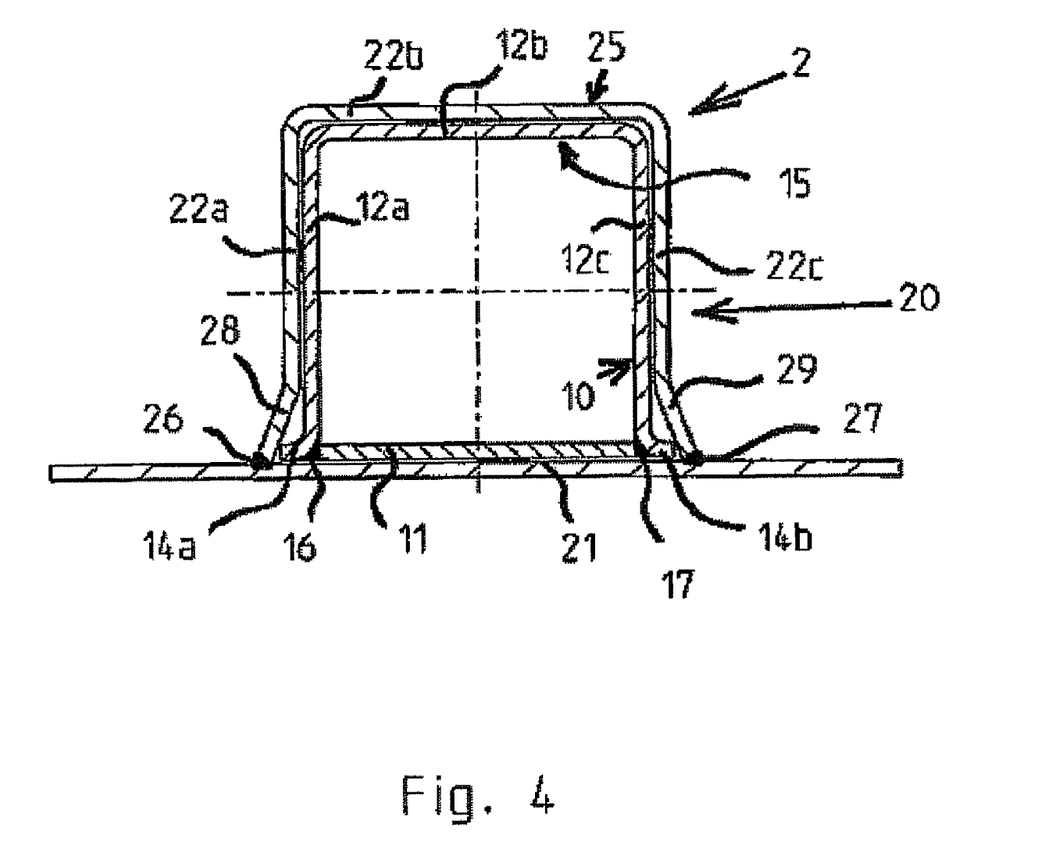
FIGS. 4-8 are cross-sections of support jacks according to other embodiments.

FIG. 4 shows another embodiment in which the inner sleeve 10 comprises laterally outwardly bent end sections 14*a*, *b* in the region of the wall plate 11, the length of which corresponds to the inner cross-section of the sleeve 10. The advantage of this embodiment is that the bending radii increase the bending stiffness.

Figure 5:
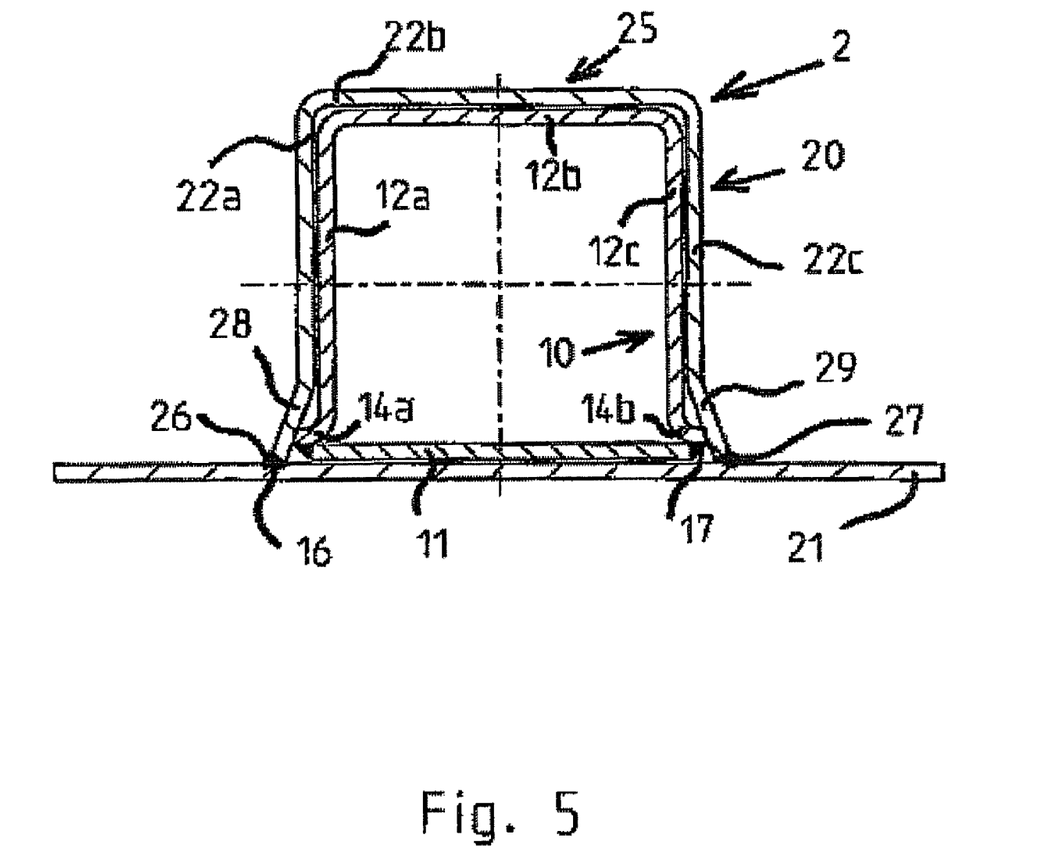

The difference between the supporting element 2 shown in FIG. 5 and that shown in FIG. 4 is that the wall plate 11 is provided with an extended design and it thus abuts against the outer side of the bent end sections 14*a*, *b* of the inner sleeve 10. The advantage of this modified embodiment is that the extended wall plate 11 and the end sections 14*a*, *b* increase the bending stiffness.

Figure 6:
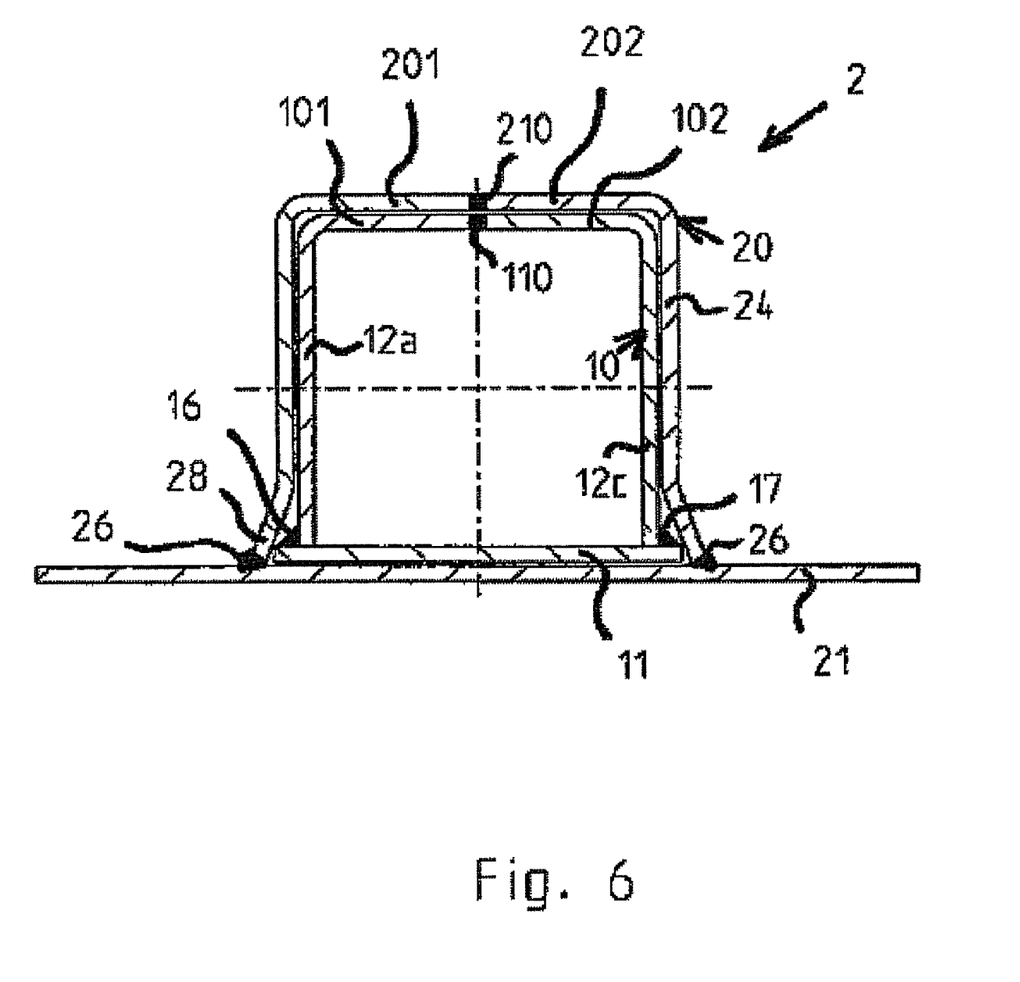

FIG. 6 shows another embodiment in which the wall plate 11 protrudes in relation to the sidewalls 12*a* and 12*c*, and thus also provides the possibility of being mounted on a vehicle (not shown). Both the inner sleeve 10 and the outer sleeve 20 are formed of angle profiles 101, 102 and 201, 202 and wall plates 11, 21 respectively. This calls for additional weld seams 110, 210 at the respective locations where the two angle profiles 101, 102 and 201, 202 abut against each other. The advantage of this design of the angle profiles is the ability to assemble this profile combination using simple primary materials.

Figure 7:
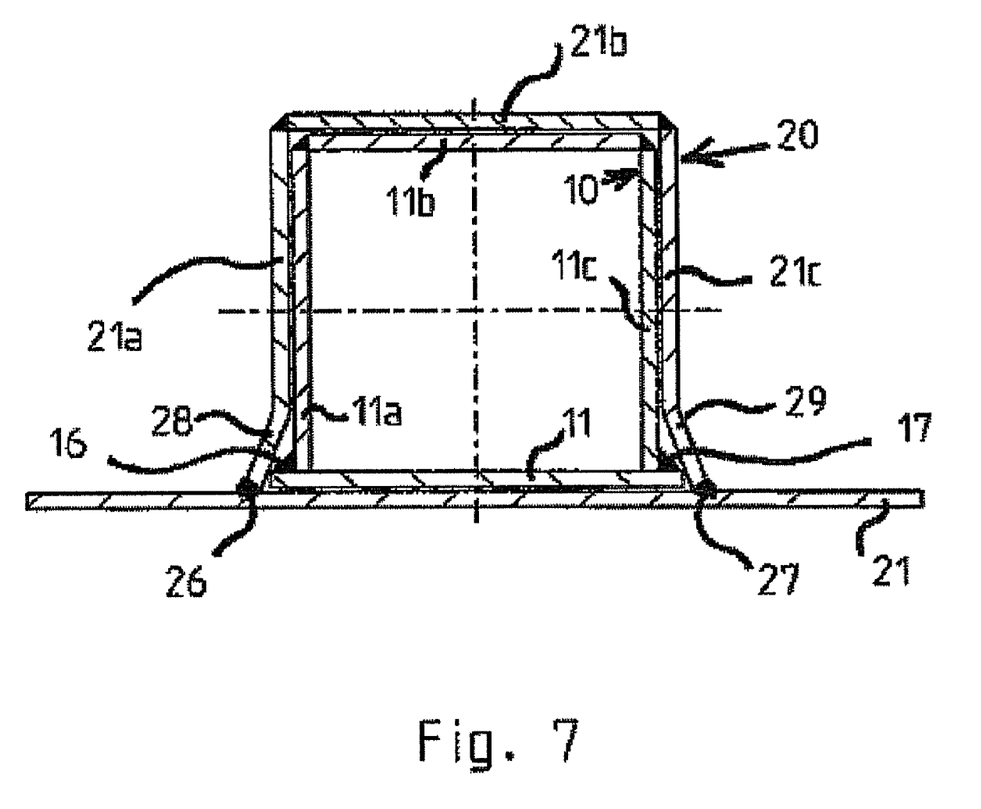

FIG. 7 shows another embodiment in which both the inner sleeve 10 and the outer sleeve 20 are formed of individual wall plates 11, 11*a*, 11*b*, 11*c*, and 21, 21*a*, 21*b*, 21*c* respectively.

Figure 8:
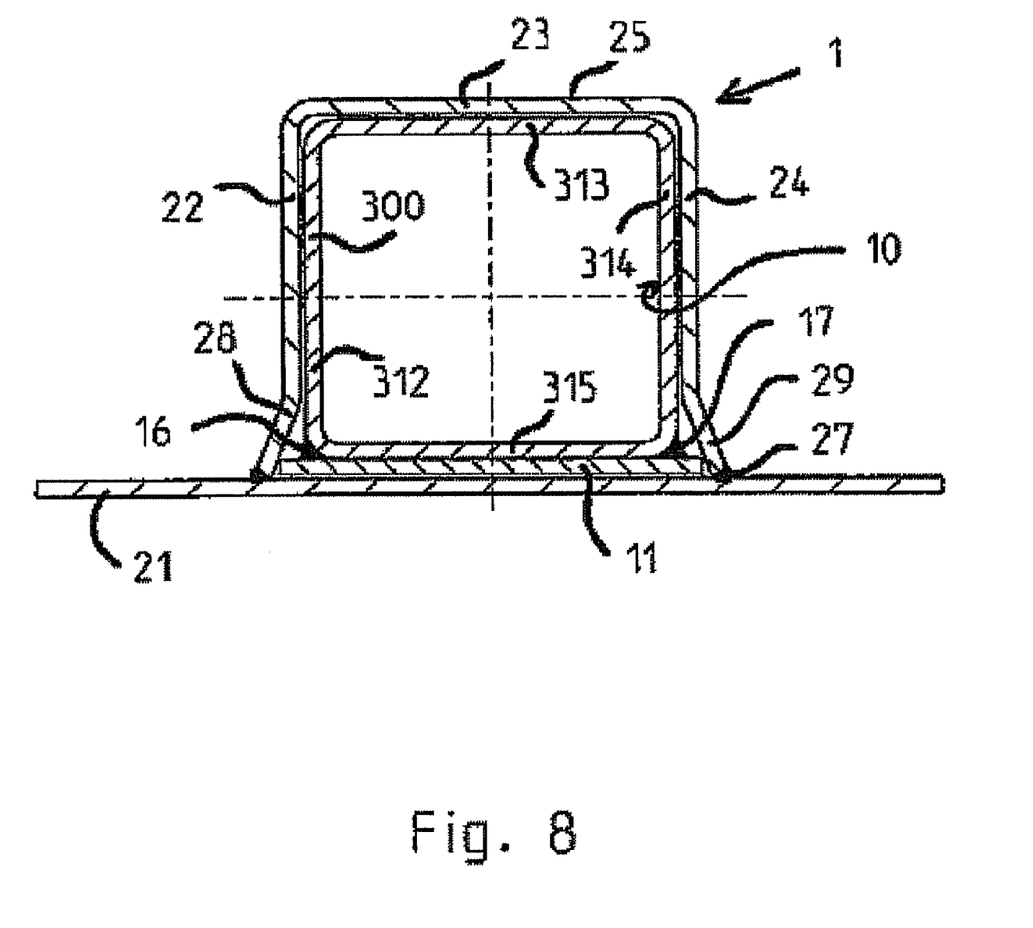

FIG. 8 shows another embodiment in which the inner sleeve 10 comprises a conventional square pipe 300, which forms the sidewalls 312-315, and the outer side of the sidewall 315 is welded on to a wall plate 11.

LIST OF REFERENCE NUMERALS

1 Support jack
2 Supporting element
3 Gearbox
4 Input shaft
8 Spindle nut
9 Spindle
10 Inner sleeve
11, 11*a*, *b*, *c* Wall plate
12*a*, *b*, *c*, *d* Sidewall
14*a*, *b* End section
15 U-profile
16 Weld seam
17 Weld seam
18 Weld seam
19 Weld seam
20 Outer sleeve
21, 21*a*, *b*, *c* Wall plate
22*a*, *b*, *c*, *d* Sidewall
25 U-profile
26 Weld seam
27 Weld seam
28 Flared wall section
29 Flared wall section
101 Angle profile
110 Weld seam
201 Angle profile
202 Angle profile
210 Weld seam
300 Square pipe
312 Sidewall
313 Sidewall
314 Sidewall
315 Sidewall

The invention claimed is:

1. A support jack for supporting semitrailers, having a support element provided with an outer sleeve and an inner sleeve that is at least partially telescopically received within the outer sleeve and can be displaced vertically in a telescopic fashion, with each sleeve having a rectangular cross-section with four side walls each, wherein at least one side wall of at least the telescopically received portion of the inner sleeve comprises a wall plate, two of the four side walls abutting the wall plate, and welded seams located inside or outside the inner sleeve connect the two abutting side walls to the wall plate.

2. A support jack according to claim 1, wherein the welded seams are located inside the inner sleeve.

3. A support jack according to claim 1, wherein the welded seams are located at the outside of each sleeve.

4. A support jack according to claim 1, 2 or 3, wherein the wall plate protrudes from the two abutting side walls.

5. A support jack according to claim 1, 2 or 3, wherein both the inner sleeve as well as the outer sleeve are each provided with at least one wall plate.

6. A support jack according to claim 1, wherein side walls of the outer sleeve adjacent to the wall plate of the inner sleeve are each provided with a flared wall section.

7. A support jack according to claim 6 wherein each of the side walls of the outer sleeve include a flared wall section adjacent to the wall plate.

8. A support jack according to claim 1, 2 or 3, wherein each sleeve comprises a wall plate and a U-profile.

9. A support jack according to claim 1, 2 or 3, wherein side walls of the inner sleeve include laterally outwardly curved sections adjacent to the wall plate of the inner sleeve and the side walls of the outer sleeve include a flared wall section adjacent to the wall plate of the outer sleeve.

10. A support jack according to claim 1, 2 or 3, wherein each sleeve consists essentially of a wall plate and two angular profiles.

11. An arrangement of a support jack at the bottom of a vehicle having a driving direction, the support jack being provided with a support element having an outer sleeve and an inner sleeve that is at least partially telescopically received within the outer sleeve and can be vertically displaced in a telescopic fashion relative to the outer sleeve, with each sleeve comprising a rectangular cross-section having four side walls each, wherein one side wall is formed as a wall plate or an additional wall plate is fixed against at least one side wall of at least that portion of the inner sleeve telescopically received within the outer sleeve, the wall plate being aligned parallel in reference to the driving direction of the vehicle.

12. An arrangement according to claim 11, wherein the wall plate points to the interior side of the vehicle.

13. A support jack for supporting a vehicle, the support jack comprising a support element having an outer sleeve and an inner sleeve that is at least partially telescopically received within the outer sleeve and can be displaced vertically in a telescopic fashion relative to the outer sleeve, at least that portion of the inner sleeve telescopically received within the outer sleeve having three walls arranged in a U-shape and a wall plate joined to two of the three walls to define a generally rectangular cross-section, the wall plate protruding beyond said two of the three walls, and welded seams fixing the wall plate to said two of the three walls.

14. The support jack of claim 13, wherein each of the two walls to which the wall plate is joined includes an outwardly flared portion adjacent to the wall plate.

15. The support jack of claim 14, wherein the welded seams are located inside the outwardly flared portions of said two walls.

16. A support jack for supporting semitrailers being provided with a support element having an outer sleeve and an inner sleeve that is at least partially telescopically received within the outer sleeve and can be vertically displaced in a telescopic fashion relative to the outer sleeve, with each sleeve comprising a rectangular cross-section having four side walls each, and an additional wall plate welded against an outer surface of at least one side wall of at least that portion of the inner sleeve that is telescopically received within the outer sleeve.

* * * * *